(12) United States Patent
Rantala et al.

(10) Patent No.: US 9,204,244 B2
(45) Date of Patent: Dec. 1, 2015

(54) METHOD, APPARATUS, AND COMPUTER PROGRAM PRODUCT FOR SYNCHRONIZATION PACKET TRANSMITTER SELECTION IN A WIRELESS NETWORK

(71) Applicant: Nokia Corporation, Espoo (FI)

(72) Inventors: Enrico Rantala, Iittala (FI); Mika Kasslin, Espoo (FI); Janne Marin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 164 days.

(21) Appl. No.: 13/858,228

(22) Filed: Apr. 8, 2013

(65) Prior Publication Data

US 2014/0302787 A1  Oct. 9, 2014

(51) Int. Cl.
*H04W 56/00*   (2009.01)
*H04W 4/00*    (2009.01)
*H04W 8/00*    (2009.01)
*H04W 84/20*   (2009.01)

(52) U.S. Cl.
CPC ............. *H04W 4/008* (2013.01); *H04W 8/005* (2013.01); *H04W 56/0015* (2013.01); *H04W 84/20* (2013.01); *Y02B 60/50* (2013.01)

(58) Field of Classification Search
USPC ............. 455/41.1, 41.2, 90.2, 450–454, 41.3, 455/3.06, 515, 411, 11.1, 404.1, 436; 370/254, 342, 255, 386, 328, 338, 436, 370/315, 238, 329, 311
See application file for complete search history.

(56) References Cited

U.S. PATENT DOCUMENTS

| | | | | |
|---|---|---|---|---|
| 5,844,900 A * | 12/1998 | Hong | ................... | H04W 74/006 370/342 |
| 6,292,508 B1 * | 9/2001 | Hong | ................... | H04B 1/7156 375/134 |
| 6,466,608 B1 * | 10/2002 | Hong et al. | ................... | 375/137 |
| 6,842,460 B1 * | 1/2005 | Olkkonen | ............. | H04W 48/16 370/328 |
| 7,809,835 B2 * | 10/2010 | Reunamaki | ........... | H04W 84/18 455/464 |
| 8,571,519 B2 * | 10/2013 | Ginzboorg | ............ | H04L 63/104 455/411 |
| 8,879,992 B2 * | 11/2014 | Kneckt | ................. | H04W 8/005 370/436 |
| 2002/0044549 A1 * | 4/2002 | Johansson et al. | ............ | 370/386 |
| 2004/0221046 A1 * | 11/2004 | Heinonen et al. | ............. | 709/227 |
| 2007/0086424 A1 * | 4/2007 | Calcev | .................. | H04J 3/0641 370/350 |

(Continued)

FOREIGN PATENT DOCUMENTS

EP    1 176 762    1/2002
EP    1 657 854    5/2006

OTHER PUBLICATIONS

Abraham: Scalable Discovery Packet Transmission-Social WiFi SIG Contribution, Nov. 16, 2012.

(Continued)

*Primary Examiner* — Ganiyu A Hanidu
(74) *Attorney, Agent, or Firm* — Locke Lord, LLP

(57) ABSTRACT

Method, apparatus, and computer program product example embodiments enable access to a wireless communications medium. In example embodiments, a method comprises determining, by a first wireless node, whether there are enough master nodes within range in a wireless communication network comprising a plurality of wireless nodes; and assuming, by the first wireless node, a role of a master node to participate in synchronization message contention in the wireless communication network, in response to determining that there are not enough master nodes within range.

21 Claims, 5 Drawing Sheets

(56) References Cited

U.S. PATENT DOCUMENTS

| | | | |
|---|---|---|---|
| 2008/0253327 A1* | 10/2008 | Kohvakka | H04W 16/14 370/330 |
| 2009/0215457 A1 | 8/2009 | Wang et al. | |
| 2009/0313310 A1* | 12/2009 | Thome et al. | 707/203 |
| 2010/0113042 A1* | 5/2010 | Kasslin et al. | 455/450 |
| 2010/0165875 A1* | 7/2010 | Kneckt et al. | 370/254 |
| 2010/0226297 A1 | 9/2010 | Kasslin et al. | |
| 2010/0304759 A1 | 12/2010 | Leppanen et al. | |
| 2011/0223937 A1 | 9/2011 | Leppanen et al. | |
| 2012/0176941 A1* | 7/2012 | Bata et al. | 370/255 |
| 2013/0072248 A1* | 3/2013 | Bajko | H04W 48/14 455/515 |

OTHER PUBLICATIONS

R. Stacey; Modified Sync Network; Social WiFi SIG Contribution, Apple, Feb. 27, 2013; pp. 1-11.
Extended European Search Report for Application No. 14160798.6-1855 completed Jul. 23, 2014.

* cited by examiner

METHOD, APPARATUS, AND COMPUTER PROGRAM PRODUCT FOR SYNCHRONIZATION PACKET TRANSMITTER SELECTION IN A WIRELESS NETWORK

FIELD

The field of the invention relates to wireless short-range communication and more particularly to accessing a wireless communications medium.

BACKGROUND

Modern society has adopted, and is becoming reliant upon, wireless communication devices for various purposes, such as, connecting users of the wireless communication devices with other users. Wireless communication devices can vary from battery powered handheld devices to household and/or commercial devices utilizing electrical network as a power source. Due to rapid development of the wireless communication devices a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, such as GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wide-band (UWB), ZigBee (IEEE 802.15.4, IEEE 802.15.4a), and ultra-high frequency radio frequency identification (UHF RFID) technologies. All of these wireless communication technologies have features that make them appropriate for various applications.

Applications for short-range wireless devices are evolving to include awareness applications providing the device with an awareness about the local network environment. Awareness applications have the promise of extending business and social networking by enabling users to share local contextual data in a peer-to-peer fashion by using their mobile wireless devices. For example, users may be able to share information in real-time for local-area business networking, social networking, dating, personal safety, advertising, publishing, and searching.

SUMMARY

Method, apparatus, and computer program product example embodiments enable accessing a wireless communications medium.

According to an example embodiment of the invention, a method comprises:

determining, by a first wireless node, whether there are enough master nodes within range in a wireless communication network comprising a plurality of wireless nodes; and assuming, by the first wireless node, a role of a master node to participate in synchronization message contention in the wireless communication network, in response to determining that there are not enough master nodes within range.

According to an example embodiment of the invention, a method comprises:

wherein determining whether there are enough master nodes within range in the wireless communication network comprises:

detecting, by the first wireless node, communication events within range in the wireless communication network; and calculating, by the first wireless node, a number of consecutive communication events without detection of a synchronization message.

According to an example embodiment of the invention, a method comprises:

determining, by the first wireless node, that there are not enough master nodes within range when the calculated number of consecutive communication events without detection of a synchronization message exceeds a first predefined threshold number.

According to an example embodiment of the invention, a method comprises:

wherein the predefined first threshold number of consecutive communication events without detection of a synchronization message is 3.

According to an example embodiment of the invention, a method comprises:

wherein the predefined first threshold number of consecutive communication events without detection of a synchronization message is 5.

According to an example embodiment of the invention, a method comprises:

wherein determining whether there are enough master nodes within range in the wireless communication network comprises:

detecting, by the first wireless node, communication events within range in the wireless communication network; and calculating, by the first wireless node, a number of consecutive communication events with a synchronization message from a single node.

According to an example embodiment of the invention, a method comprises:

determining, by the first wireless node, that there are not enough master nodes within range when the calculated number of consecutive communication events with a synchronization message from the single node exceeds a predefined second threshold number.

According to an example embodiment of the invention, a method comprises:

wherein the predefined second threshold number of consecutive communication events with a synchronization message from the single node without detection of a synchronization message is 5.

According to an example embodiment of the invention, a method comprises:

wherein the predefined second threshold number of consecutive communication events with a synchronization message from the single node without detection of a synchronization message is 7.

According to an example embodiment of the invention, a method comprises:

determining, by the first wireless node, that there are enough master wireless nodes within range in the wireless communication network;

calculating, by the first wireless node, a random draw based on at least one of a current number of master wireless nodes within range or an estimated number of wireless nodes within range in the wireless communication network; and assuming, by the first wireless node, a role of a master wireless node to participate in synchronization message contention in the communications network, in response to winning the random draw.

According to an example embodiment of the invention, an apparatus comprises:

at least one processor;

at least one memory including computer program code;

the at least one memory and the computer program code configured to, with the at least one processor, cause the apparatus at least to:

determine whether there are enough master nodes within range in a wireless communication network comprising a plurality of wireless nodes; and assume a role of a master node to participate in synchronization message contention in the wireless communication network, in response to determining that there are not enough master nodes within range.

According to an example embodiment of the invention, an apparatus comprises:

wherein determining whether there are enough master nodes within range in the wireless communication network comprises:

the at least one memory and the computer program code configured to, with the at least one processor, cause the apparatus at least to:

detect communication events within range in the wireless communication network; and calculate a number of consecutive communication events without detection of a synchronization message.

According to an example embodiment of the invention, an apparatus comprises:

the at least one memory and the computer program code configured to, with the at least one processor, cause the apparatus at least to:

determine that there are not enough master nodes within range when the calculated number of consecutive communication events without detection of a synchronization message exceeds a first predefined threshold number.

According to an example embodiment of the invention, an apparatus comprises:

wherein the predefined first threshold number of consecutive communication events without detection of a synchronization message is 3.

According to an example embodiment of the invention, an apparatus comprises:

wherein the predefined first threshold number of consecutive communication events without detection of a synchronization message is 5.

According to an example embodiment of the invention, an apparatus comprises:

wherein determining whether there are enough master nodes within range in the wireless communication network comprises:

the at least one memory and the computer program code configured to, with the at least one processor, cause the apparatus at least to:

detect communication events within range in the wireless communication network; and calculate a number of consecutive communication events with a synchronization message from a single node.

According to an example embodiment of the invention, an apparatus comprises:

the at least one memory and the computer program code configured to, with the at least one processor, cause the apparatus at least to:

determine that there are not enough master nodes within range when the calculated number of consecutive communication events with a synchronization message from the single node exceeds a predefined second threshold number.

According to an example embodiment of the invention, an apparatus comprises:

wherein the predefined second threshold number of consecutive communication events with a synchronization message from the single node without detection of a synchronization message is 5.

According to an example embodiment of the invention, an apparatus comprises:

wherein the predefined second threshold number of consecutive communication events with a synchronization message from the single node without detection of a synchronization message is 7.

According to an example embodiment of the invention, an apparatus comprises:

the at least one memory and the computer program code configured to, with the at least one processor, cause the apparatus at least to:

determine that there are enough master wireless nodes within range in the wireless communication network;

calculate a random draw based on at least one of a current number of master wireless nodes within range or an estimated number of wireless nodes within range in the wireless communication network; and assume a role of a master wireless node to participate in synchronization message contention in the communications network, in response to winning the random draw.

According to an example embodiment of the invention, a computer program product comprises computer executable program code recorded on a computer readable non-transitory storage medium, the computer executable program code comprising:

code for determining, by a first wireless node, whether there are enough master nodes within range in a wireless communication network comprising a plurality of wireless nodes; and code for assuming, by the first wireless node, a role of a master node to participate in synchronization message contention in the wireless communication network, in response to determining that there are not enough master nodes within range.

The resulting example embodiments enable access to a wireless communications medium.

DISCUSSION OF EXAMPLE EMBODIMENTS OF THE INVENTION

Figure 1:
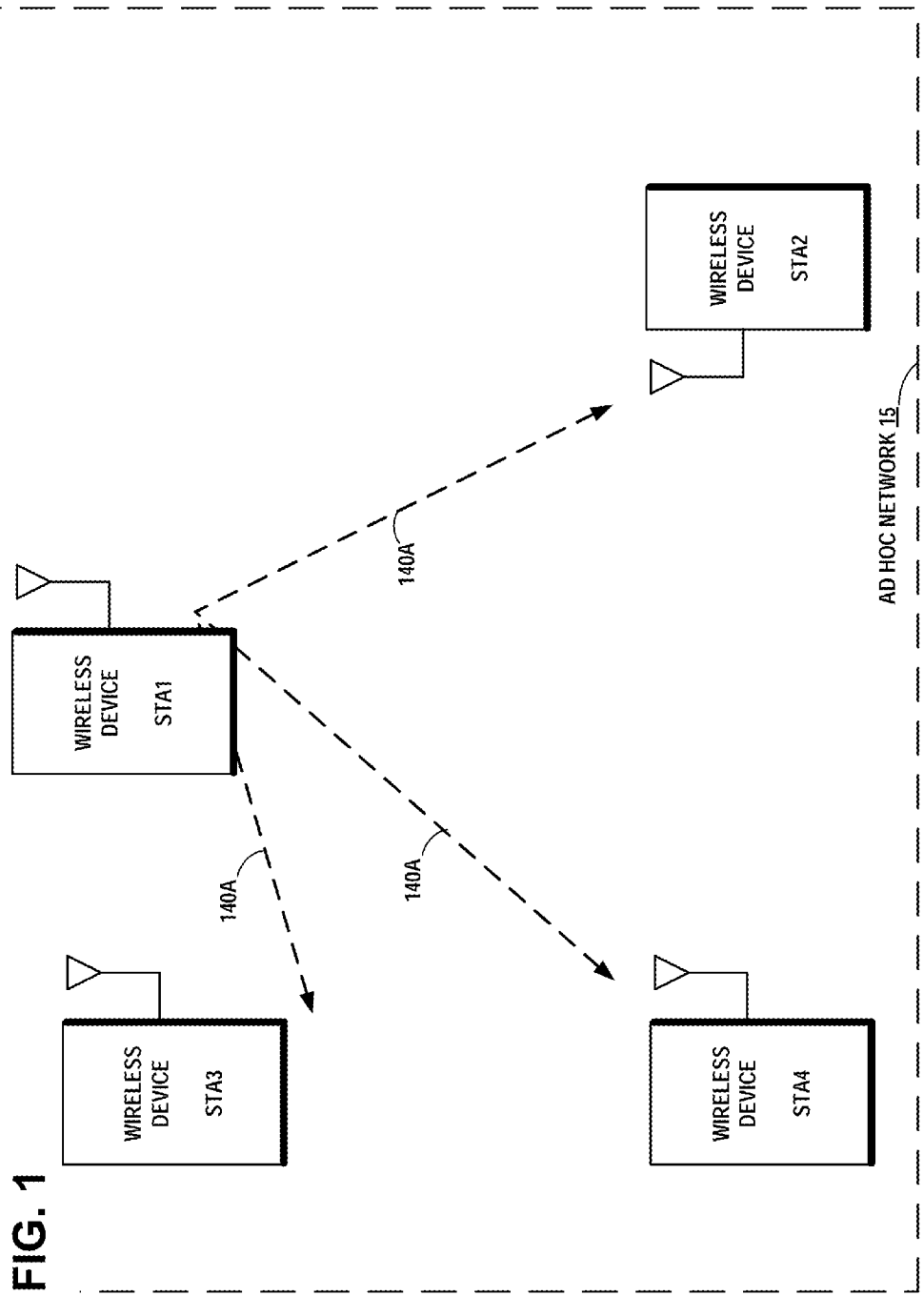
FIG. 1 illustrates an example network diagram of an ad hoc network where all of the STAs are in the same contention group. A STA operates in one of two roles: A Master Sync STA competes with other Master STAs to transmit the Beacon. A Non-Master Sync STA does not transmit a Beacon. The Master Sync STA role is determined by the Master Election Algorithm for Neighbor Awareness Networking, in accordance with at least one embodiment of the present invention.

This section is organized into the following topics:
A. WLAN Communication Technology
B. Awareness Network Technology
C. Master Election Algorithm For Neighbor Awareness Networking

A. WLAN Communication Technology

The IEEE 802.11 standard specifies methods and techniques of an exemplary wireless local area network (WLAN) operation. Examples include the IEEE 802.11b and 802.11g wireless local area network specifications, which have been a staple technology for traditional WLAN applications in the 2.4 GHz ISM band. The various amendments to the IEEE 802.11 standard were consolidated for IEEE 802.11a, b, d, e, g, h, i, j, k, n, r, s, u, v, and z protocols, into the base standard *IEEE 802.11-2012, Wireless Medium Access Control (MAC) and Physical Layer (PHY) Specifications*, February 2012. Since then, emerging broadband applications have stimulated interest in developing very high-speed wireless networks for short range communication, for example, the planned IEEE 802.11ac, and the planned IEEE 802.11ad WLAN specifications that are to provide a very high throughput in various frequency bands. Applications of these IEEE 802.11 standards include products such as consumer electronics, telephones, personal computers, and access points for both for home and office.

A WLAN may be organized as an independent basic service set (IBSS) or an infrastructure basic service set (BSS). Wireless devices or stations (STAs) in an independent basic service set (IBSS) communicate directly with one another and there is no access point in the IBSS. WLAN ad hoc networks have an independent configuration where the mobile devices communicate directly with one another, without support from a fixed access point. WLAN ad hoc networks support distributed activities similar those of the Bluetooth™ piconets. The IEEE 802.11 standard provides wireless devices with service inquiry features similar to the Bluetooth™ inquiry and scanning features.

The independent basic service set (IBSS) has a BSS Identifier (BSSID) that is a unique identifier for the particular ad hoc network. Its format is identical to that of an IEEE 48-bit address. In an ad hoc network, the BSSID is a locally administered, individual address that is generated randomly by the device that starts the ad hoc network.

Synchronization is the process of the devices in an ad hoc network getting in step with each other, so that reliable communication is possible. The MAC provides the synchronization mechanism to allow support of physical layers that make use of frequency hopping or other time-based mechanisms where the parameters of the physical layer change with time. The process involves beaconing to announce the presence of an ad hoc network, and inquiring to find an ad hoc network. Once an ad hoc network is found, a device joins the ad hoc network. This process is entirely distributed in ad hoc networks, and relies on a common time base provided by a timing synchronization function (TSF). The TSF may maintain a 64-bit timer running at 1 MHz and updated by information from other devices. When a device begins operation, it may reset the timer to zero. The timer may be updated by information received in beacon frames.

Each wireless device or STA maintains a TSF timer with modulus $2^{64}$ counting in increments of microseconds. STAs expect to receive Beacon frames at a nominal rate. The interval between Beacon frames is defined by a Beacon Period parameter of the STA. A STA sending a Beacon frame sets the value of the Beacon frame's timestamp so that it equals the value of the STA's TSF timer at the time that the data symbol containing the first bit of the timestamp is transmitted to the PHY plus the transmitting STA's delays through its local PHY from the MAC-PHY interface to its interface with the antenna or light-emitting diode (LED) emission surface.

In an ad hoc network, since there is no access point (AP) to act as the central time source for the ad hoc network, the timer synchronization mechanism is completely distributed among the mobile devices of the ad hoc network. Since there is no AP, the mobile device that starts the ad hoc network will begin by resetting its TSF timer to zero and transmitting a Beacon, choosing a beacon period. This establishes the basic beaconing process for this ad hoc network. After the ad hoc network has been established, each device in the ad hoc network will attempt to send a Beacon after the target beacon transmission time (TBTT) arrives. To minimize actual collisions of the transmitted Beacon frames on the medium, each device in the ad hoc network may choose a random delay value which it may allow to expire before it attempts its beacon transmission.

Once a device has performed an inquiry that results in one or more ad hoc network descriptions, the device may choose to join one of the ad hoc networks. The joining process is a purely local process that occurs entirely internal to the mobile device. There is no indication to the outside world that a device has joined a particular ad hoc network. Joining an ad hoc network may require that all of the mobile device's MAC and physical parameters be synchronized with the desired ad hoc network. To do this, the device may update its timer with the value of the timer from the ad hoc network description, modified by adding the time elapsed since the description was acquired. This will synchronize the timer to the ad hoc network. The BSSID of the ad hoc network may be adopted, as well as the parameters in the capability information field. Once this process is complete, the mobile device has joined the ad hoc network and is ready to begin communicating with the devices in the ad hoc network.

There are three major types of medium access control (MAC) frames in the IEEE 802.11 protocol: the management frame, the control frame, and the data frame. Management frames provide management services. Data frames carry payload data. Control frames assist in the delivery of data and management frames. Each of these types of MAC frame consists of a MAC header, a frame body, and a frame check sequence (FCS). The header contains control information used for defining the type of 802.11 MAC frame and providing information necessary to process the MAC frame. The frame body contains the data or information included in either management type or data type frames. The frame check sequence is a value representing a cyclic redundancy check (CRC) over all the fields of the MAC header and the frame body field.

1. Beacon

The beacon frame is a management frame that is transmitted periodically to allow mobile devices to locate and identify an ad hoc network. Beacon generation in an IBSS is distributed. The value of the beacon period is included in Beacon and Probe Response frames, and devices or STAs adopt that beacon period when joining the IBSS. All members of the IBSS participate in beacon generation. Each STA maintains its own TSF timer that is used for Beacon Period timing. The beacon interval within an IBSS is established by the STA when the START request primitive is performed within a device to create the IBSS. This defines a series of target beacon transmission times (TBTT) exactly a Beacon Period apart, which is the time at which an ad hoc device must send a beacon. Time zero is defined to be a TBTT. At each TBTT the STA waits for the random backoff interval and then sends a Beacon frame if the random delay has expired and no other Beacon frame has arrived from the IBSS of which the STA is a member during the delay period.

The beacon frame includes the fields: timestamp, beacon interval, and capability information. The timestamp contains the value of the device's synchronization timer (TSF) at the time that the frame was transmitted. The capability information field is a 16-bit field that identifies the capabilities of the device. The information elements in a beacon frame are the service set identifier (SSID), the supported rates, one or more physical parameter sets, an optional contention-free parameter set, an optional ad hoc network parameter set, and an optional traffic indication map. There is no restriction on the format or content of the 32 byte SSID.

The first ad hoc device to become active establishes an IBSS and starts sending beacons that to maintain synchronization among the devices. Other ad hoc devices may join the network after receiving a beacon and accepting the IBSS parameters, such as the beacon interval, found in the beacon frame.

Each device that joins the ad hoc network may send a beacon periodically if it doesn't hear a beacon from another device within a short random delay period after the beacon is supposed to be sent. If a device doesn't hear a beacon within the random delay period, then the device assumes that no other devices are active and a beacon needs to be sent. A beacon signal is periodically transmitted from the ad hoc network. The beacon frame is transmitted periodically and includes the address of the sending device.

2. Probe Request

The probe request frame is a management frame that is transmitted by a mobile device attempting to quickly locate a wireless LAN. It may be used to locate a wireless LAN with a particular SSID or to locate any wireless LAN. The probe request frame may contain the service attribute request. The effect of receiving a probe request is to cause the device to respond with a probe response. When a wireless device arrives within the communication range of any member of an ad hoc network, its probe request frame inquiry signals are answered by a member of the ad hoc network detecting the inquiry. A device in an ad hoc network responds to the probe request frame inquiry signals with a probe response containing the address of the responding device. The probe response frame also includes the timestamp, beacon interval, capability information, information elements of the SSID, supported rates, one or more physical parameter sets, the optional contention-free parameter set, and the optional ad hoc network parameter set.

For active scans, the WLAN radio may broadcast a probe request on the medium it is scanning using a broadcast SSID in the probe request. The WLAN radio will add any received beacons or probe responses to a cached basic service set identifier (BSSID) scan list. For passive scans, the WLAN radio does not send a probe request, but instead, listens on a medium for a period of time and adds any received beacons or probe responses to its cached BSSID scan list. The WLAN radio may scan both infrastructure and ad hoc networks, regardless of the current setting of its network mode. The WLAN radio may use either the active or passive scanning methods, or a combination of both scanning methods. When performing an active scan, the WLAN radio sets the BS SID to the broadcast MAC address in the probe request it sends. The WLAN radio performs the scan across all the frequency mediums and bands that it supports.

3. Probe Response

Devices or STAs in an IBSS respond to probe requests if it is awake at a given time to receive and respond to the probe requests. In an IBSS, a STA that sent a Beacon frame remains in the Awake state and responds to probe requests, until a Beacon frame with the current BSSID is received. There may be more than one STA in an IBSS that responds to any given probe request, particularly in cases where more than one STA transmitted a Beacon frame following the most recent TBTT, either due to not receiving successfully a previous Beacon frame or due to collisions between beacon transmissions. In an IBSS, STAs receiving Probe Request frames respond with a probe response when the SSID in the probe request is the wildcard SSID or matches the specific SSID of the STA. In an IBSS a STA that transmitted a Beacon frame since the last TBTT responds to group addressed Probe Request frames. A STA in an IBSS responds to Probe Request frames sent to the individual address of the STA. Probe Response frames are sent as directed frames to the address of the STA that generated the probe request.

4. Carrier Sense Multiple Access with Collision Avoidance (CSMA/CA)

According to an example embodiment, the IEEE 802.11 WLAN may use two types of transmission: Distributed Coordination Function (DCF) and Point Coordination Function (PCF). DCF employs Carrier Sense Multiple Access with Collision Avoidance (CSMA/CA). A packet sent may be positively acknowledged by the receiver. A transmission may begin with a Request to Send (RTS) and the receiver may respond with a Clear to Send (CTS). The channel may be cleared by these two messages, since all STAs that hear at least one of the CTS and the CTS may suppress their own start of a transmission. The Request to Send (RTS) packet sent by the sender and the Clear to Send (CTS) packet sent in reply by the intended receiver, may alert all other devices within range of the sender or the receiver, to refrain from transmitting for the duration of the main packet.

According to an example embodiment, when data packets are transmitted, each may have a Network Allocation Vector (NAV) containing a duration value to reserve the channel for the sender and receiver for an interval after the current packet, equal to the NAV duration. The network allocation vector (NAV) is an indicator that may be maintained by each STA, of time periods when transmission onto the wireless medium will not be initiated by the STA whether or not the STA's physical carrier sensing function senses that the medium is busy. Use of the NAV for carrier sensing is called virtual carrier sensing. STAs receiving a valid frame may update their NAV with the information received in the duration field for all frames where the new NAV value is greater than the current NAV value, including the RTS and CTS packets, as well data packets. The value of the NAV decrements with the passage of time. Once the sender and receiver have reserved the channel, they may hold it for the remaining duration of the NAV value. The last acknowledgement packet (ACK) contains a NAV value of zero, to release the channel.

In a block acknowledgement (BA), instead of transmitting an individual ACK for every MAC protocol data unit (MPDU), multiple MPDUs may be acknowledged together using a single BA frame. Block Ack (BA) contains bitmap size of 64*16 bits. Each bit of this bitmap represents the success or failure status of a MPDU.

According to an example embodiment, standard spacing intervals are defined in the IEEE 802.11 specification, which delay a station's access to the medium, between the end of the last symbol of the previous frame and the beginning of the first symbol of the next frame. The short interframe space (SIFS), the shortest of the interframe spaces, may allow acknowledgement (ACK) frames and clear to send (CTS) frames to have access to the medium before others. The longer duration distributed coordination function (DCF) interframe space (IFS) or DIFS interval may be used for transmitting data frames and management frames.

According to an example embodiment, after the channel has been released, IEEE 802.11 wireless devices normally employ a spectrum sensing capability during the SIFS interval or DIFS interval, to detect whether the channel is busy. A carrier sensing scheme may be used wherein a node wishing to transmit data has to first listen to the channel for a predetermined amount of time to determine whether or not another node is transmitting on the channel within the wireless range. If the channel is sensed to be idle, then the node may be permitted to begin the transmission process. If the channel is sensed to be busy, then the node may delay its transmission for a random period of time called the backoff interval. In the DCF protocol used in IEEE 802.11 networks, the stations, on sensing a channel idle for DIFS interval, may enter the backoff phase with a random value between 0 and CWmin. The backoff counter may be decremented from this selected value as long as the channel is sensed idle.

According to an example embodiment, an algorithm, such as binary exponential backoff, may be used to randomly delay transmissions, in order to avoid collisions. The transmission may be delayed by an amount of time that is the product of the slot time and a pseudo random number. Initially, each sender may randomly wait 0 or 1 slot times. After a busy channel is detected, the senders may randomly wait between from 0 to 3 slot times. After the channel is detected to be busy a second time, the senders may randomly wait between from 0 to 7 slot times, and so forth. As the number of transmission attempts increases, the number of random possibilities for delay increases exponentially. An alternate backoff algorithm is the truncated binary exponential backoff, wherein after a certain number of increases, the transmission timeout reaches a ceiling and thereafter does not increase any further.

According to an example embodiment, it may also be possible to start data transmission directly without RTS-CTS signaling and in that case, the first packet carries information similar to the RTS to start protection.

5. Synchronization

Synchronization is the process of the devices in an ad hoc network getting in step with each other, so that reliable communication is possible. The MAC may provide the synchronization mechanism to allow support of physical layers that make use of frequency hopping or other time-based mechanisms where the parameters of the physical layer change with time. The process may involve beaconing to announce the presence of an ad hoc network, and inquiring to find an ad hoc network. Once an ad hoc network is found, a device may join the ad hoc network. This process may be entirely distributed in ad hoc networks, and may rely on a common timebase provided by a timer synchronization function (TSF). The TSF may maintain a 64-bit timer running at 1 MHz and updated by information from other devices. When a device begins operation, it may reset the timer to zero. The timer may be updated by information received in beacon frames.

Since there is no AP, the mobile device that starts the ad hoc network may begin by resetting its TSF timer to zero and transmitting a beacon, choosing a beacon period. This establishes the basic beaconing process for this ad hoc network. After the ad hoc network has been established, each device in the ad hoc network will attempt to send a beacon after the target beacon transmission time (TBTT) arrives. To minimize actual collisions of the transmitted beacon frames on the medium, each device in the ad hoc network may choose a random delay value which it may allow to expire before it attempts its beacon transmission.

Once a device has performed an inquiry that results in one or more ad hoc network descriptions, the device may choose to join one of the ad hoc networks. The joining process may be a purely local process that occurs entirely internal to the mobile device. There may be no indication to the outside world that a device has joined a particular ad hoc network. Joining an ad hoc network may require that all of the mobile device's MAC and physical parameters be synchronized with the desired ad hoc network. To do this, the device may update its timer with the value of the timer from the ad hoc network description, modified by adding the time elapsed since the description was acquired. This will synchronize the timer to the ad hoc network. The BSSID of the ad hoc network may be adopted, as well as the parameters in the capability information field. Once this process is complete, the mobile device has joined the ad hoc network and is ready to begin communicating with the devices in the ad hoc network.

6. Quality of Service (QoS)

The Quality of Service (QoS) support in the IEEE 802.11 WLAN protocol is provided by access categories (ACs) and multiple independent backoff entities. The Quality of Service (QoS) support defines the MAC procedures to support local area network (LAN) applications with quality of service (QoS) requirements, including the transport of voice, audio, and video.

Packets are delivered by parallel backoff entities operating within the same WLAN device, where backoff entities are prioritized using AC-specific contention parameters. There are four access categories (ACs) and thus, four backoff entities exist in every WLAN device. The AC-specific contention parameters are labeled according to their target application: AC_VO for voice or audio packets, AC_VI for video packets, AC_BE for packets whose delivery is on a best effort basis, and AC_BK for background packets. The four access categories (ACs) define the priorities in accessing the medium by setting individual interframe spaces, contention windows, and other medium access parameters per access category (AC).

Contention-based medium access is performed in every backoff entity by using different parameter values for the AC-specific contention parameters. The AC-specific contention parameters are announced via information fields in beacon frames. The same AC-specific contention parameters are used by the backoff entities different WLAN devices in the network.

Each backoff entity within a WLAN device independently contends for a transmit opportunity (TXOP) of a packet. It starts down-counting the backoff-counter after detecting the medium being idle for a duration defined by the arbitration interframe space (AIFS) that is based on the value of the AC-specific contention parameter of the packet to be transmitted. The arbitration interframe space (AIFS) defines the earliest access time that the WLAN device may transmit the packet. Voice packets that have the AC-specific contention parameter AC_VO and video packets that have the AC-specific contention parameter AC_VI have a high value for access priority. Best effort basis packets that have the AC-specific contention parameter AC_BE have a medium value for access priority. Background packets that have the AC-specific contention parameter AC_BK have a low value for access priority.

The minimum size of the contention window, CWmin, for transmission of a packet, is another parameter dependent on the AC-specific contention parameter. The smaller the CWmin, the higher the priority of the packet for accessing the medium. Voice packets that have the AC-specific contention parameter AC_VO have the smallest contention window whereas background packets that have the AC-specific contention parameter AC_BK have the longest contention window.

B. Awareness Network Technology

Applications for short-range wireless devices are evolving to include awareness applications providing the device with an awareness about the local network environment. A non-limiting example awareness network architecture is the Nokia AwareNet framework, a network of wireless mobile devices self-organizing to support various applications, ranging from social networking to service discovery. Awareness information may be shared by a short-range wireless device sending an anonymous flooding message that may include a query, over an ad hoc network. A neighboring short-range wireless device may reply to the flooding message over the ad hoc network with a response, such as a pointer to a discovered location-based service.

Awareness information may include any information and/or context about a local network environment as well as the users and communication devices within the local network environment. Wireless devices may continuously collect and exchange information with other devices in a local network environment. Awareness applications running on short-range wireless devices may create a network for sharing awareness information, locate and organize awareness information, form communities for sharing awareness information, manage power consumption for devices engaged in sharing awareness information, develop applications to take advantage of the awareness information, and maintain the privacy and anonymity of users sharing awareness information.

Awareness applications running on short-range wireless devices, build upon the IEEE 802.11 ad hoc mode or independent basic service set (IBSS), in which every device participates in beaconing and all the other basic operations that keep the ad hoc network in operation. An ad hoc network may be designed to have one service set identifier (SSID) that all of the devices in the network share. The SSID may be announced in the beacons transmitted by the devices. The basic service set identifier (BSSID) may be intended to represent a beacon group of devices or network instance, rather than the whole network itself. The devices announce the BSSID they use and follow, in the beacons they transmit. In the overall design, those devices that operate under same SSID are driven to use a common and shared BSSID, since the BSSID of a wireless device in an ad hoc network becomes the BSSID of the oldest network instance value in the network. The determination of which BSSID is used by a device is made by the network instance timer value, and this timer value is communicated in beacons in the timing synchronization function (TSF) value parameter. The devices are required to operate by assuming the oldest TSF value (i.e. largest TSF value) contained in the received beacons that represent the network with the SSID in which the devices are operating. Alternatively, an ad hoc network has no SSID but the BSSID is used as the network identifier and only the BSSID is announced in the beacons. Then the BSSID represents the whole network instead of a beacon group of devices or network instance and the BSSID is used in beacon filtering to determine whether a received beacon is used in synchronization.

When the radio and MAC of a wireless device transmits a Beacon, the Beacon MAC-header contains device's own current TSF value. The device may automatically transmit a reply message when it receives a Beacon from another network, the reply message being referred herein as a beacon response message. The beacon response message contains the current TSF value of the replying network.

Wireless devices form a network where all devices in proximity may communicate with each other. When two or more groups of devices forming two or more instances of the network come close to each other, the two or more instances may merge to become one network instance. Devices may make a merging or join decision to change the instance autonomously based on the TSF information collected from Beacons received during scan periods or based on the TSF information collected from received beacon response messages. A merging decision may be performed when a device receives a Beacon or beacon response message with an older (greater) TSF value from another wireless device. Two devices may be considered to belong to different network instances if their BSSIDs are the same and their TSF difference is greater than a fixed constant threshold value (for example 1000 μs). After the merging decision has been performed by a device, the device moves into the new network instance.

The awareness functionality in a short-range wireless device may be divided between four layers in the awareness architecture. The Awareness Layer and the Community Layer provide services for applications, i.e. provide the awareness API. The approximate functional split between the different layers is as follows.

Awareness Layer

According to an embodiment, Awareness Layer (AwL) has the highest level of control of the awareness architecture.

Example services the AwL offers to the applications comprise Publish and Subscribe. The Awareness Layer receives publish and subscribe requests from applications and maps these into queries and query responses that, in turn, are mapped as awareness messages, the Network Layer PDU, that traverse from device to device. It also maps the awareness messages received by the device, to the application. The network layer does not appear as a data pipe for applications. A single awareness message is self-contained and short, the AwL compresses the messages in order for them to consume as little resources as possible.

The Awareness Layer may comprise an internal storage of awareness data items. Publishing an item normally means storing it in this internal storage (passive publish). Such an item is visible to other devices in the local vicinity and may be found using the Subscribe service. It is also possible to use active publishing that causes the Awareness Layer to issue a publish message that propagates from device to device. It is the responsibility of the AwL to decide whether a received message leads to the notification of an application (filtering). Items may be marked to be visible to only certain communities, so that they are visible only to searches made by members of such a community.

The Subscribe request causes the Awareness Layer to issue either a single or repetitive query message(s) that eventually propagate to other devices in the local vicinity (by using the functionality of lower awareness layers). When such a query message reaches the AwL of a device that happens to possess a matching information item, it responds with a reply message. The lower layers of awareness architecture take care of the routing of such a message back to the AwL of the querying device, which notifies the application of the other device that issued the Subscribe request.

Community Layer

The concept of communities has been integrally built into awareness architecture. Awareness communication may be visible to all the devices, or just to those that belong to a certain community. Regardless of this visibility, all wireless devices take part in the routing of messages. The role of the Community Layer (CoL) is to implement the community visibility rules. Only those messages that a certain device has visibility to (i.e. a device belongs to the same community as the message) are passed to the AwL. As an additional level of community privacy, messages are encrypted by the Community Layer. To allow such message filtering and encryption/decryption, the CoL stores the community credentials for those communities to which the user of the device belongs. The default awareness community (all local users) does not use any credentials and therefore its messages simply pass through the Community Layer.

According to an example embodiment, Awareness architecture comprises three different kinds of communities: the default awareness community, peer communities and personal communities. Communities may also be categorized with their privacy. Messages of public communities are transmitted as plain text whereas messages of private communities are transmitted encrypted. The default awareness community is the default community for all wireless devices. Awareness community messages are not encrypted and every node may send and receive awareness community messages (public community). In a peer community all members are equal and every member may receive all the community specific messages. A peer community may be public, or it may be private meaning that community messages are encrypted using a temporary key derived from the community specific shared key. The encryption function may be based on Advanced Encryption Standard, EAX mode (AES/EAX) with 128 bit keys. A personal community has a community owner that manages the community. A non-owner community member may communicate with the owner but not with other members of the community. A personal community is private, meaning that community messages from the owner to other members may be encrypted.

Network Layer

The Network Layer (NL) takes care of the local dissemination of the awareness messages. This is accomplished by way of a smart-flooding algorithm that attempts to adapt to the surrounding device density. At high densities, very few devices participate in the transmission of a given message. At low densities, all the devices may retransmit each message (normal flooding). The awareness network has a flat hierarchy; none of the devices may assume any special roles. Thus, at high densities, all the devices will transmit approximately the same amount of traffic (no clustering). The Network layer may also take care of the routing of the replies back to the device that issued the search. To this end, it collects routing information from the messages that flow through it. It also keeps track of all the neighbors and their approximate distance. Normally, reply routing uses unicast transmissions, whereas flooding messages are always broadcasted. All the messages received by the Network Layer are passed to Community Layer in order to check whether the message should be processed in the AwL.

Link Layer

Link Layer performs the adaptation between the underlying radio technology (e.g. IEEE 802.11 WLAN physical layer) and the Network Layer. It maps the specific information of the radio technology, such as radio identifiers and received signal strengths, into technology neutral information used by the Network Layer (NL). Multiple Link Layer instances may be used by the NL, e.g. for simultaneous usage of different radio technologies.

The Link Layer may be divided into two sub layers: logical link control (LLC) and media access control (MAC). LLC provides radio technology agnostic service for the Network Layer. It hides differences between radio technology specific MACs. LLC provides a single service access point for the Network layer. LLC knows how to map the generic provided service to the service provided by the technology specific MACs. The LLC internal data structures include the Neighbor Table that contains information of all the neighboring devices that have been heard in the recent past.

The Link Layer tries to transmit data via the given medium using the TransmitData functionality. Transmission may succeed or it may fail. Internally the Link Layer may try transmissions several times if a medium is temporarily busy. The Link Layer passes all the messages it receives to the Network Layer. This also includes unicast messages that are intended for other nodes.

The logical link control (LLC) is aware of radio technology specific MACs. In case of the IEEE 802.11 WLAN MAC example, the LLC does the following WLAN MAC specific actions:
Control (Reset, Configure) WLAN MAC.
Decide when to merge WLAN networks.
Construct a message package to be sent to WLAN MAC from outgoing messages.

Select which messages are to be sent and which are ignored immediately, e.g. if there are too many messages to be sent.

Extract incoming data messages contained in reception reports.

Update the Neighbor Table when reception reports and scan reports are received.

Merging of WLAN networks may be the responsibility of the logical link control (LLC). The LLC may determine when to merge two WLAN network instances or beacon groups as a single larger network instance or a beacon group. LLC may calculate an estimate of its own WLAN network size. Estimation may be based on information provided by the Network Layer, information found in the LLC Neighbor Table and network size category shared by other nodes. A network size category is calculated from an estimated network size.

The IEEE 802.11 WLAN MAC awareness mode enables a wireless device to use its power efficiently. In the awareness mode, the WLAN radio is asleep most of the time, thus reducing power consumption. Messages are transmitted and received in a batch mode, i.e. LLC passes all the messages that the MAC is to transmit during a single awake period, in a single package. The MAC passes all the messages received during a single awake period in a single reception report. The LLC collects messages to be transmitted in a single package. When the MAC is awake, the LLC passes the package to the MAC and it tries to transmit the messages. When the MAC is about to go asleep, it sends a transmission report to the LLC containing information about messages it has succeeded to transmit and about messages it has failed to transmit. In addition MAC passes a reception report to LLC. The report contains messages received during the awake period.

According to an embodiment, the merging or joining process is a purely local process that occurs entirely internally to the wireless device. There is no indication to the outside world that a device has joined a particular ad hoc network. Joining an ad hoc network may require that all of the mobile device's MAC and physical parameters be synchronized with the desired ad hoc network. To do this, the device may update its timer with the TSF value of the timer from the ad hoc network description, modified by adding the time elapsed since the description was acquired. This will synchronize the device's timer to the ad hoc network. The BSSID of the ad hoc network may be adopted, as well as the parameters in the capability information field. Once this process is complete, the wireless device has joined the ad hoc network and is ready to begin communicating with the wireless devices in the ad hoc network.

The IEEE 802.11 WLAN MAC awareness mode provides the following functionalities:

Reset MAC.
Configure MAC.
Join a WLAN network or create a new network.
Join an existing WLAN network (BSSID is known).
Set a template for beacon frames so that LLC parameters can be passed in WLAN beacon frames.
Try to transmit a set of messages.
Receive a set of incoming messages.
Receive a set of WLAN scan messages Message Propagation According to an embodiment, the propagation of an awareness search message is conducted in the awareness architecture layers of different devices. An application initiates a subscription in the device by using the Subscribe service offered by the Awareness Layer. The Awareness Layer realizes the subscription by sending a query message to other devices. In all the devices the message goes at least up to the Community Layer. However, only in those devices that belong to the community to which the message was intended, does the message proceed to the AwL. There is no need to have an application present in the replying device. It is sufficient to only have the awareness platform active.

C. Master Election Algorithm for Neighbor Awareness Networking

In accordance with an example embodiment, the invention may be used in the logical architecture of the Neighbor Awareness Networking (NAN) program being standardized by the Wi-Fi Alliance (WFA). The NAN protocol stack is expected to comprise of two components: 1) NAN Discovery Engine, 2) MAC with NAN support. MAC with NAN support provides means for NAN devices to synchronize in time and frequency to provide common availability periods for service discovery frames from/to the NAN Discovery Engine. The NAN Discovery Engine provides Publish and Subscribe services to the applications for service discovery purposes.

Publishing is the ability to make application-selected information about e.g. capabilities and services available for other NAN devices that seek information with Subscribing using protocols and mechanism certified by the Neighbor Awareness Networking program. NAN devices that use Publishing may provide published information in unsolicited or solicited manner.

Subscribing is the ability to discover information that has been made available in other NAN device with Publishing using protocols and mechanism certified by the Neighbor Awareness Networking program. NAN devices that use Subscribing may passively listen or actively seek for published information.

Publish and Subscribe services are expected to exploit a discovery protocol that the NAN Discovery Engine implements and which is designed for NAN. The protocol is expected to have three different protocol messages: 1) Discovery query message, 2) Discovery response message, and 3) Discovery announcement message. The Subscribe service is expected to use the Discovery query message to conduct active discovery. The Subscribe service may be configured to operate in passive mode only. Then no Discovery query messages are transmitted but one listens for Discovery response and Discovery announcement messages to find out information one is looking for. The Publishing service is expected to use the Discovery response message and Discovery announcement message to announce availability of application-selected information to discovering devices. The Discovery response message is intended to be used as a response to a received Discovery query which meets response criteria. The Discovery announcement message is intended to be used to implement unsolicited Publishing service.

A device in which the Subscribe service has been activated in active mode transmits Discovery query messages to trigger Publishing devices to transmit Discovery response messages. In parallel the Subscribing device monitors received Discovery response and Discovery announcement messages to figure out availability of services and information one is looking for. Monitoring is envisioned to be continuous process which applies to all Discovery response and Discovery announcement messages received while the Subscribe service is active. With this approach a Subscribing device may gather valuable information from Discovery response and Discovery announcement messages independently from its own Discovery query message transmissions.

IEEE 802.11 wireless devices normally employ Carrier Sense Multiple Access (CSMA), wherein a spectrum sensing capability is used during an interval like the SIFS interval, DIFS interval or AIFS interval, to detect whether the channel is busy. A carrier sensing scheme may be used wherein a node wishing to transmit data has to first listen to the channel for a predetermined amount of time to determine whether or not another node is transmitting on the channel within the wireless range. If the channel is sensed to be idle, then the node may be permitted to begin the transmission process. If the channel is sensed to be busy, then the node may delay its transmission for a random period of time called the backoff interval. In the DCF protocol used in IEEE 802.11 networks, the stations, on sensing a channel idle for DIFS interval, may enter the backoff phase with a random value between 0 and CWmin. The backoff counter may be decremented from this selected value as long as the channel is sensed idle. Binary exponential backoff may be used to randomly delay transmissions, in order to avoid collisions. The transmission may be delayed by an amount of time that is the product of the slot time and a pseudo random number. Initially, each sender may randomly wait 0 or 1 slot times. After a busy channel is detected, the senders may randomly wait between from 0 to 3 slot times. After the channel is detected to be busy a second time, the senders may randomly wait between from 0 to 7 slot times, and so forth. As the number of transmission attempts increases, the number of random possibilities for delay increases exponentially.

The mobile device that starts an ad hoc network will begin by resetting its TSF timer to zero and transmitting a Beacon, choosing a beacon period, which establishes the basic beaconing process for this ad hoc network. After the ad hoc network has been established, each device in the ad hoc network will attempt to send a Beacon after the target beacon transmission time (TBTT) arrives, choosing a random delay value to avoid collisions. Each device in a beacon group receives a beacon including timing synchronization of the beacon group of which the device is a member. The synchronized devices in the beacon group should be simultaneously available during a discovery interval to listen for and to exchange messages. Discovery intervals may be aligned with TBTTs. The beginning of a discovery interval may be aligned with a TBTT or alternatively, a discovery interval may be deemed to start upon reception or transmission of a beacon after a TBTT.

In accordance with an example embodiment of the invention, a node, device, or STA may operate in one of two roles: As a Master Sync STA, it competes with other Master STAs to transmit a Beacon. As a Non-Master Sync STA, it does not compete to transmit a Beacon. Master Sync STA role is determined by the Master Election Algorithm for Neighbor Awareness Networking. Every node, device, or STA of an ad hoc network may need to be able to operate in both roles and the Master Election Algorithm may need to be run by every node, device, or STA once a while or periodically.

In accordance with an example embodiment of the invention, a node, device, or STA may estimate the number of its neighboring nodes. In an embodiment, an estimate number of neighbors may be obtained by detecting beacons, other scanning messages, or awareness messages, from the neighboring nodes. For example, a first node may increase the detected number of its neighboring nodes by one upon receiving an awareness message or beacon from any of the other nodes in its network. Other mechanisms to estimate the neighborhood size may be applied. For example, an estimate of the neighborhood size may be acquired from the observed traffic or there may be servers that know the neighbors' MAC-addresses and distance estimates.

FIG. 1 illustrates an example network diagram of an ad hoc network 15 where all of the STAs are in the same contention group. A STA may operate in one of two roles: Master Sync STA: competes with other Master STAs to transmit the Beacon. Non-Master Sync STA: does not compete to transmit a Beacon. Master Sync STA role is determined by the Master Election Algorithm for Neighbor Awareness Networking. Every STA may need to run the Master Election Algorithm to determine whether the STA needs to take the Master Sync STA role.

The example contention group is the same as a beacon group, that is a group of devices that have the same target beacon transmission time (TBTT). The contention group in FIG. 1 includes wireless devices STA1, STA2, STA3, and STA4. A beacon transmitted by one of the devices distributes its TSF value to the other receiving devices, synchronizing them so all of the devices in the contention group have a TSF value that is approximately the same. The beacon interval within the contention group is established by the first device that creates the contention group, which defines a series of TBTTs exactly a Beacon Period apart. The wireless devices within a beacon group synchronize by establishing a common time base provided by the timing synchronization function maintained in each device. The beacon frames that each device sends include the value of the device's TSF timer at the time that the beacon is transmitted. When a device receives a beacon from within its the beacon group, if the TSF value in the beacon is larger than the device's own TSF counter value, then the device adopts the TSF value communicated in the beacon.

In an example embodiment of the invention, if the STA1 operates in the Non-Master Sync STA role and detects numerous consecutive beacons from the same MAC address implicating that there are only a few neighboring devices, then the STA1 may decide to become a Master Sync STA that competes with other Master STAs to transmit the Beacon 140A.

Figure 2:
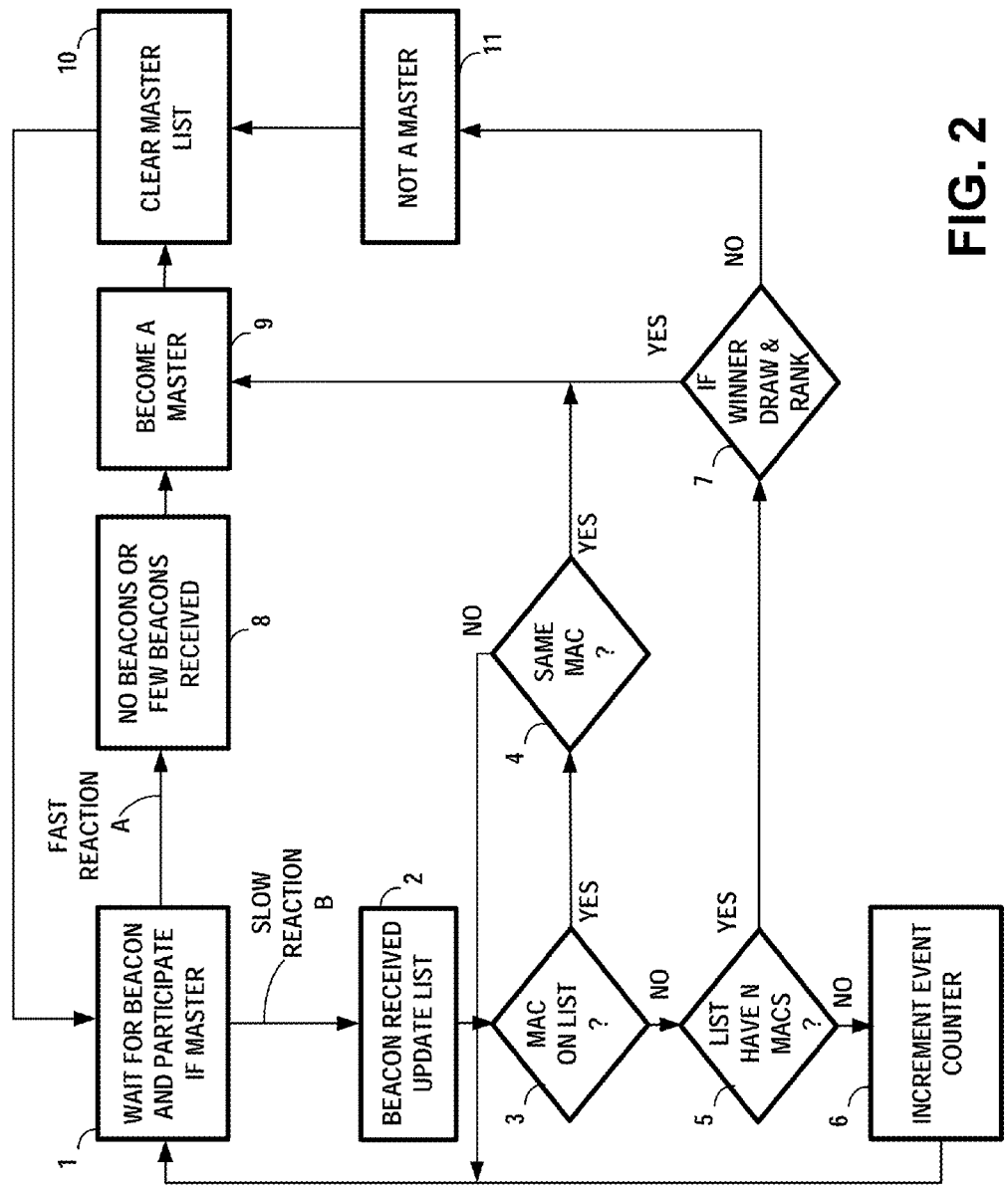
FIG. 2 is an example flow diagram of operational steps in the wireless device STA1 of FIG. 1, in carrying out the Master election algorithm, in accordance with at least one embodiment of the present invention.

FIG. 2 is an example flow diagram of operational steps in the wireless device STA1 of FIG. 1, in determining whether to become a Master Sync STA, in accordance with at least one embodiment of the present invention. Determination builds upon the TBTTs that are considered events so that whenever a device is available at a TBTT for beacon reception or beacon contention, it behaves as illustrated in the example flow diagram.

The basis of the Master Election Algorithm For Neighbor Awareness Networking is as follows:

The algorithm runs on events and each TBTT is considered as an event. According to a default implementation, a device is available and active on every TBTT and thus every TBTT is counted as an event. A device operating in a neighbor awareness network (NAN) may miss some of the TBTTs and for those cases it may be that either all the TBTTs regardless of whether the device is active on the TBTT are considered as events, or only those TBTTs on which the device is active are counted as events.

Master election algorithm has two mechanisms and related rules: the Fast reaction A and the Slow reaction B.

a) Fast reaction A:

Each device that operates in a NAN is responsible for taking a Master Sync STA role upon detecting that there are too few Master Sync STAs within range. The intent is to limit amount of Master Sync STAs in the neighborhood (within range) to ca. 3-5 devices but the system doesn't cope with a situation of no Master Sync STAs or only a very few of them in a neighborhood. Thus each device operating in a NAN has responsibilities to take the Master Sync STA role upon detecting that there are not enough if any Master Sync STAs within range. In this description this responsibility is called fast reaction and example rules are given below.

b) Slow reaction B:

Even if there are enough Master Sync STAs in the neighborhood of a device operating in a NAN, each device needs to once in a while determine whether to take the Master Sync STA role. The objective is to have the beaconing role distributed and shared among the devices while taking into account the master preference. Each device operating in a NAN has responsibilities to determine periodically with some jitter whether to take the Master Sync STA role. In this description this responsibility is called slow reaction and example rules are given below.

The operational steps of the flow diagram of FIG. 2 begin with Step 1:

Step 1: Wait for a beacon and participate in beaconing if a Master Sync STA. Update event counter by 1 once per TBTT. Each TBTT when a device is awake may be considered an event and the device increments its event counter by 1 on every event. From Step 1, the options are to either go to Step 8 for the Fast Reaction A or go to Step 2 for the Slow Reaction B.

The Fast Reaction A—from Step 1 to Step 8:

Fast reaction rules are as follows a) Upon detecting X1 consecutive events without received beacons in Step 1, a device that operates in a NAN takes the Master Sync STA role by proceeding to Step 8. In one embodiment of the invention, the X1 is equal to '3'. In another embodiment of the invention, a device generates a random number that it adds to X1 to avoid numerous devices simultaneously to react on lack of beacons. The random number may be generated, as an example, from a range of 0 through 2.

b) Upon detecting X2 consecutive events with beacons from one and only one Master Sync STA, a device that operates in a NAN takes the Master Sync STA role. The X2 has a value greater than X1. In one embodiment of the invention, the X2 is equal to '5'. In another embodiment of the invention, a device generates a random number that it adds to X2 to avoid numerous devices simultaneously to react on lack of beacons. The random number may be generated, as an example, from a range of 0 through 2.

c) Once a device has taken the Master Sync STA role in Step 9, due to one of the fast reaction rules, the device resets the event counter to zero in Step 10.

The Slow Reaction B—from Step 1 to Step 2:

Slow reaction rules are as follows a) Once a device that operates in a NAN has detected X3 consecutive events without resetting the event counter (i.e. the device has not taken the Master Sync STA role due to the fast reaction rules), it determines whether it needs to take the Master Sync STA role. In one embodiment of the invention the X3 is equal to '35'. In another embodiment of the invention a device generates a random number that it adds to X3 to randomize the process. The random number may be generated, as an example, from a range of 0 through 7. It may also depend on estimated number of neighboring devices in the NAN. The determination builds upon the following principles:

Do a random draw (based on number of neighboring nodes) in Step 7, which requires Uniform(0,1)<M/n, where M is number of Master Sync STAs from which the device received beacon since the device reset the event counter to zero, and n is the estimated number of neighboring nodes in the NAN. If the device wins the draw, it determines, as an example, based on the master preference values and MAC addresses of the detected Master Sync STAs and the device itself, whether it takes the Master Sync STA role. If the device loses the draw at Step 7, it takes the Non-Master Sync STA role at Step 11.

b) Once the device has determined whether it takes the Master Sync STA role or not it shall reset the event counter to zero at Step 10.

Referring to the example flow diagram of FIG. 2:

Step 2: When a beacon is received, the device updates master list. Each device maintains a Master list which is a collection of information of received beacons. Master list element contains at least MAC address and Master Preference.

Step 3: Is the beacon's MAC already in the master list? If yes, goto Step 4. If no, goto Step 5.

Step 4: Have B beacons been received from the same MAC address? If yes, goto Step 9. The Device may decide to become a Master if it detects beacons from same MAC address implicating only few neighboring devices. If no, goto Step 1.

Step 5: Does the Master list contain N MAC addresses (Is the Master list is full)? If yes, goto step 7. If no, goto Step 6:

Step 6: Update event counter=E+ϵ (where ϵ is a random number that depends on the number of neighboring nodes in the communication network). The goal is that the device collects N beacons before a Master decision. If the Master list is not full, the Event threshold is reset and goto Step 1. An event may be a TBTT.

Step 7: If the Master list is full, the Master decision takes place. Do a random draw (based on number of neighboring nodes), which requires Uniform(0,1)<M/n, where M is number of Masters in Master list, and n is the number of neighboring nodes in the communication network. Uniform(0,1) is a uniformly distributed pseudo-random number drawn from interval [0,1]. If the device wins the draw, Master list is sorted first by master preference and second by MAC address hashed by running number of current TBTT. The device adds itself to the Master list, but the master preference is jittered. If the device rank in the list is ≤N, where N is number of masters, device the becomes or continues as Master; the yes: goto Step 9. If no, then goto Step 11, and the device is not a master.

Step 8: If the Master list is not full after E+ϵ events or no beacons have been received after E/2 events, this implies that there are only few neighboring devices. This is second shortcut to become a Master. Goto Step 9.

Step 9: Become a master or continue as a master. Goto Step 10. Step 10: After Master decision, the Master list is cleared. Also new ϵ is drawn, this randomizes the time when Master decision is made between devices. The reason of use of ϵ is as follows. Since number of Masters is a stochastic process which expected number is known, it may also occur that number of Masters is much lower. This may lead to situation that master list is not filled before shortcut to be a Master is used (i.e. all devices at neighborhood falsely think that there are only few devices in neighborhood). ϵ is selected so that it is random but depends on number of neighborhood to prevent all devices at neighborhood become a Master simultaneously. Goto Step 1.

Step 11: Not a master. Goto Step 10.

In accordance with an example embodiment of the invention, the number of neighboring devices is taken into account in the decision to become a Master. It is advantageous that only few devices (for example 5 devices) out of neighborhood are expected to be Masters because of collision probability decrease. This enables scalability in synchronization.

In accordance with an example embodiment of the invention, the decision may take place when a fixed number of synchronization messages are received from different devices (for example 5 beacons from different MAC addresses). In this manner, there is no need to fix the time interval for the decision. Since the expected number of Masters is known, the decision may be made to become a Master after receiving synchronization messages from a proportion of expected number of Master devices.

In accordance with an example embodiment of the invention, when powering up or entering such space where there are only few neighboring devices, it is advantageous to become a master as soon as possible. This may be concluded from received synchronization messages: if there are none or they are originated from only few devices, the device may become a master after this conclusion.

In accordance with an example embodiment of the invention, every device has a probability greater than zero to become a master regardless master preference of neighboring devices. This overcomes the tendency for those devices that are more willing to be a Master would be more likely to be selected as Masters than unwilling devices. Since master preference is the first key when selecting candidates to be Master, it may happen that an unwilling device never become a Master. This behavior is not wanted, rotating synchronization responsibility among every device is fair and also provides more geographical coverage. In accordance with an example embodiment of the invention, every device has a probability greater than zero to become a master regardless master preference of neighboring devices. In accordance with an example embodiment of the invention, the decision to become a Master device adds a random jitter to its master preference, or alternatively random jitter to all collected master preferences. In this manner, a less willing device may make the decision to become a Master over some more willing devices.

In an example embodiment of the invention, the messages transmitted by wireless devices in a beacon group may be propagated in consecutive hops from a sender device to a receiver device and retransmitted to a next receiver device, using a smart flooding and routing protocol managed by the network layer in each device. Whenever a wireless device schedules transmission for any message, the smart flooding and routing protocol procedure may be executed. For unicast messages, the latest routing information is obtained from a Routing Table in the network layer before forwarding the message to the Link Layer of the device for transmission. The hop count value in the received message is incremented by one by each consecutive receiving device. When the maximum hop count is reached in a receiving device, as specified in the received message, the message is removed from the Message transmission buffer in the device. In an alternate embodiment, the hop count value may be initially set to the maximum hop count and decremented by one with each hop. When the hop count reaches zero, then the message is removed from the message transmission buffer in the device.

In an example embodiment of the invention, the network layer in a wireless device manages incoming messages and retransmissions with the smart-flooding and routing protocol. When a wireless device receives a message, it may perform the following operations:

1. It updates the internal tables (neighbor table, routing table and medium table) based on the message information.
2. It checks whether it already "knows" this message by "looking" at its message ID (MsgID) information that can be obtained from the network layer header. If yes, the message reception is counted and the message is discarded. If the reception-counter for a certain message has reached a threshold, the previously scheduled retransmission of that message is cancelled.
3. The message is scheduled for further transmission. For a message with a destination address, retransmission may be the next possible transmission opportunity. For a message without a destination address, retransmission may be delayed until later.
4. The message is provided to upper layers, i.e., the community layer and the awareness layer, for processing.

Figure 3:
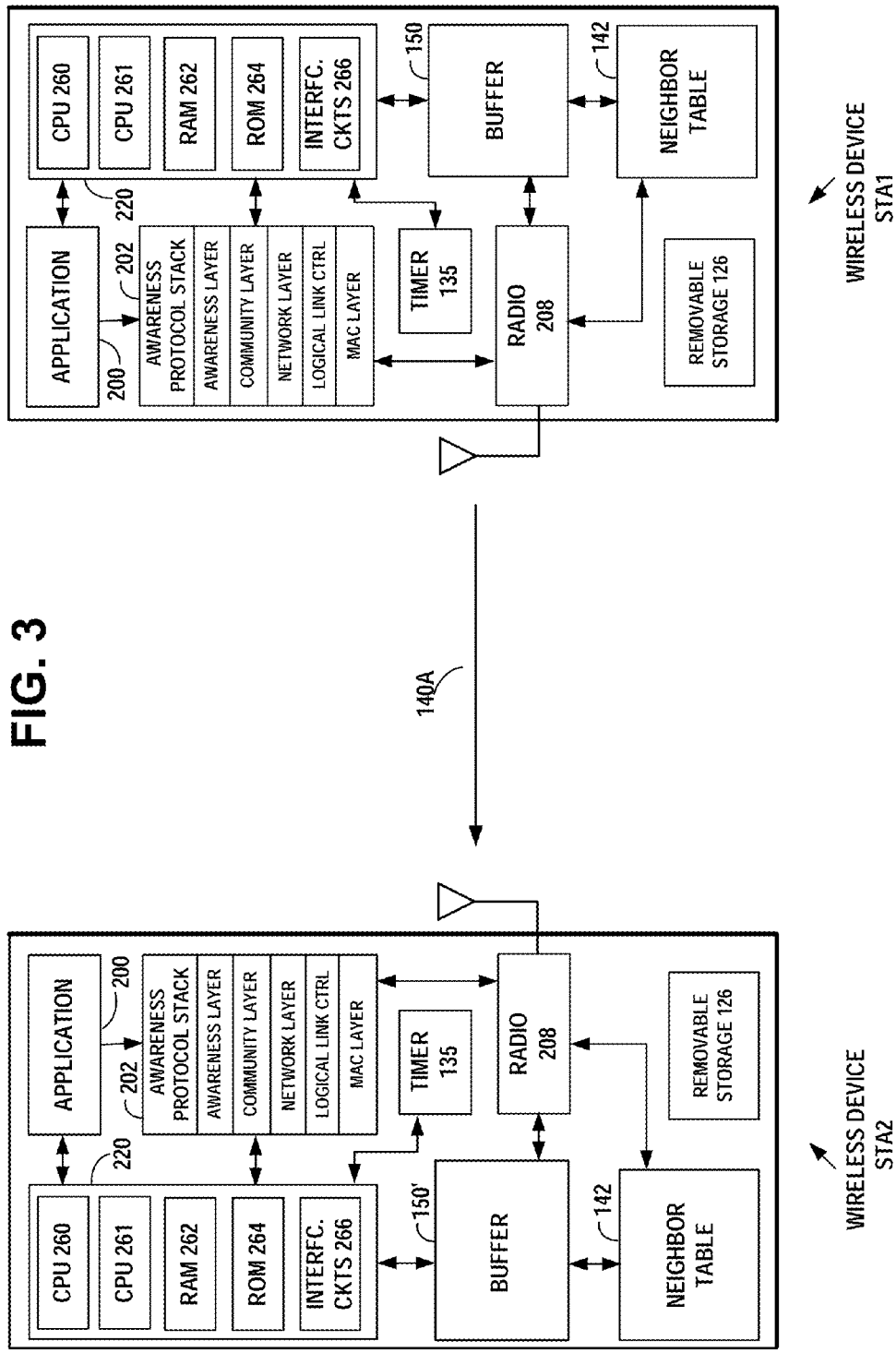
FIG. 3 is an example functional block diagram of the wireless device STA1 and the wireless device STA2 of FIG. 1, in accordance with at least one embodiment of the present invention.

FIG. 3 is an example functional block diagram of the wireless device STA1 and the wireless device STA2 of FIG. 1, in accordance with at least one embodiment of the present invention. FIG. 3 shows an example embodiment of the internal architecture of the wireless device STA2 receiving the packet 140A from the wireless device STA1 and an example embodiment of the internal architecture of the wireless devices STA1 and STA2. The wireless device STA2 listens with radio 208 on a medium for a period of time and adds any received beacons or frames to its cached BSSID scan list in its RAM 262. The figure shows the wireless device STA2 receiving a frame 140A from the wireless device STA1.

In an example embodiment of the invention, the wireless device STA1 and the wireless device STA2 may be a communications device, PDA, cell phone, laptop or palmtop computer, or the like or it may be a stationary access point, automotive dashboard interface, home electronics interface or other stationary interface or device. The wireless device STA1 and the wireless device STA2 may be a remote controller, healthcare monitor, sports sensor, token, key fob, watch, wireless keyboard, gaming pad, body sensor, toy, health care equipment, human interface device, entertainment device, wireless microphone, GPS sensor, or the like.

In an example embodiment of the invention, the wireless device STA1 and the wireless device STA2 may include a processor 220 that includes a single core or multi-core central processing unit (CPU) 260 and 261, a random access memory (RAM) 262, a read only memory (ROM) 264, and interface circuits 266 to interface with the radio transceiver 208. The wireless device STA1 and the wireless device STA2 may each further include a battery and other power sources, key pad, touch screen, display, microphone, speakers, ear pieces, camera or other imaging devices, etc. The RAM 262 and ROM 264 may be removable memory devices such as smart cards, SIMs, WIMs, semiconductor memories such as RAM, ROM, PROMS, flash memory devices, etc. according to an embodiment of the present invention. According to an example embodiment of the invention, the wireless device STA1 and the wireless device STA2 each include the awareness protocol stack 202.

In an example embodiment of the invention, the awareness protocol stack 202 may include the Awareness Layer, the Community Layer, the Network Layer, and the Link Layer that is divided into two sub layers: the logical link control (LLC) and the media access control (MAC). The Neighbor Table 142 in the logical link control (LLC), may include a list of all the network instances having member neighboring devices that have been heard from in the recent past. In an example embodiment of the invention, for each network instance in the neighbor table, a record or entry is made of at least its SSID and BSSID, which are recorded from the values in the most recently received beacon or beacon response message from the network instance. In an example embodiment of the invention, the neighbor table may also include the TSF value from a network instance, and it may be updated from the beacons and beacon response messages received from the network instance. The record may also include the received signal strength and an identifying indicium entered by the user or the application that identifies past memberships with the network instance, conversational sessions with a user of a device in the network instance, or other characteristics of the network instance. The Neighbor Table 142 in the logical link control (LLC) is updated when reception reports and scan reports are received from the MAC layer. The MAC passes to the LLC in the reception report, the SSID, BSSID, and other values of all the messages received during the previous awake period.

Figure 5:
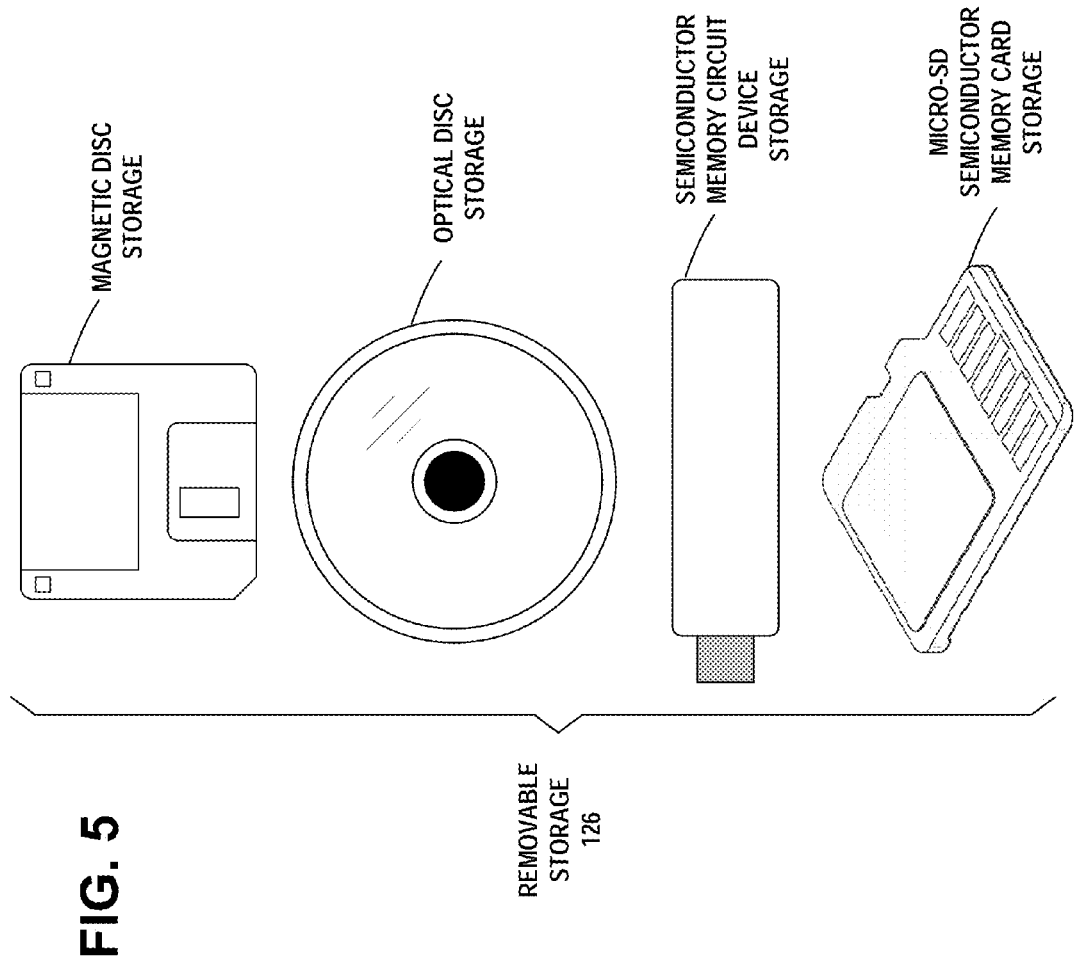
FIG. 5 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with an example embodiment of the invention.

In an example embodiment of the invention, the processor 220, protocol stack 202 and/or application program 200 may be embodied as program logic stored in the RAM 262 and/or ROM 264 in the form of sequences of programmed instructions which, when executed in the CPUs 260 and/or 261, carry out the functions of the disclosed embodiments. The program logic may be delivered to the writeable RAM, PROMS, flash memory devices, etc. 262 of the wireless device STA1 and the wireless device STA2 from a computer program product or article of manufacture in the form of computer-usable media such as resident memory devices, smart cards or other removable memory devices, as illustrated in FIG. 5. Alternately, they may be embodied as integrated circuit logic in the form of programmed logic arrays or custom designed application specific integrated circuits (ASIC). The radio 208 in the each of the wireless device STA1 and the wireless device STA2 may be separate transceiver circuits or alternately, the radio 208 may be a single radio module capable of handling one or multiple mediums in a high speed, time and frequency multiplexed manner in response to the processor 220. The program code for instructing the apparatus to perform its various operations may be stored in computer readable media, for example magnetic disks, CD ROMS, or flash memory devices. The program code may be downloaded from such computer readable media to be stored for example in the RAM 262 or programmable ROM 264 of the wireless device STA1 and the wireless device STA2 for execution of the program code for example by the CPUs 260 and/or 261. Removable storage media 126 are shown in FIG. 5.

Figure 4:
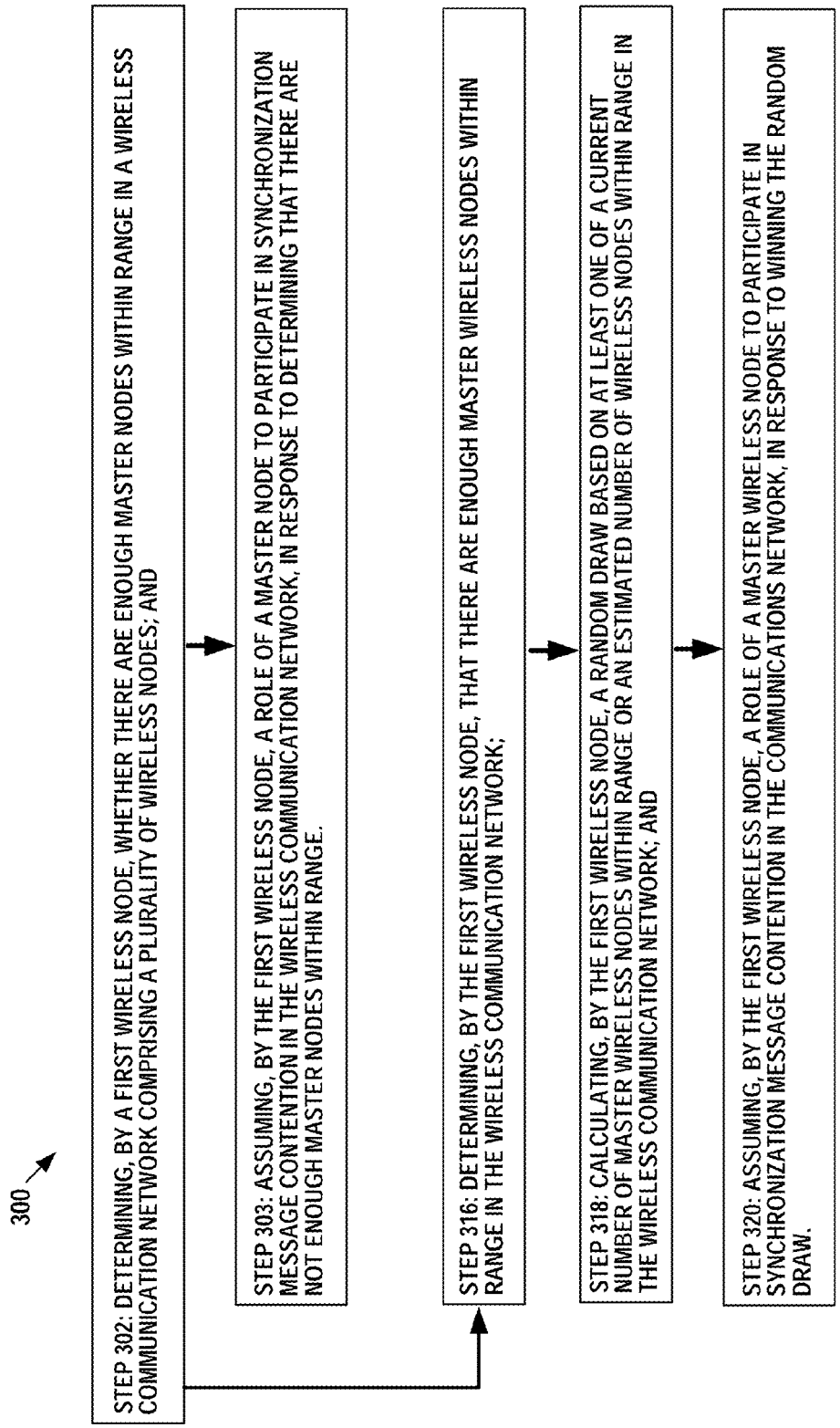
FIG. 4 is an example flow diagram of operational steps in the wireless device STA1 of FIG. 1, in accordance with at least one embodiment of the present invention.

FIG. 4 illustrates an example flow diagram 300 of an example operation of the wireless device STA1, in accordance with an example embodiment of the invention. The steps of the flow diagram represent computer code instructions stored in the RAM and/or ROM memory, which when executed by the central processing units (CPU) CPU1 and/or CPU2, carry out the functions of the example embodiments of the invention. The steps may be carried out in another order than shown and individual steps may be combined or separated into component steps. The flow diagram has the following steps:

Step 302: determining, by a first wireless node, whether there are enough master nodes within range in a wireless communication network comprising a plurality of wireless nodes; and Step 303: assuming, by the first wireless node, a role of a master node to participate in synchronization message contention in the wireless communication network, in response to determining that there are not enough master nodes within range.

In an example embodiment of the invention, the determining Step 302 of determining whether there are enough master nodes within range in the wireless communication network, may further comprise Steps 304, 306, and 308, as follows:

Step 304: detecting, by the first wireless node, communication events within range in the wireless communication network;

Step 306: calculating, by the first wireless node, a number of consecutive communication events without detection of a synchronization message; and Step 308: determining, by the first wireless node, that there are not enough master nodes within range when the calculated number of consecutive communication events without detection of a synchronization message exceeds a first predefined threshold number.

In an example embodiment of the invention, the predefined first threshold number of Step 308, of consecutive communication events without detection of a synchronization message is 3.

In an example embodiment of the invention, the predefined first threshold number of Step 308, of consecutive communication events without detection of a synchronization message is 5.

In an example embodiment of the invention, the determining Step 302 of determining whether there are enough master nodes within range in the wireless communication network, may further comprise Steps 310, 312, and 314, as follows:

Step 310: detecting, by the first wireless node, communication events within range in the wireless communication network; and Step 312: calculating, by the first wireless node, a number of consecutive communication events with a synchronization message from a single node.

Step 314: determining, by the first wireless node, that there are not enough master nodes within range when the calculated number of consecutive communication events with a synchronization message from the single node exceeds a predefined second threshold number.

In an example embodiment of the invention, the predefined second threshold number of Step 314, of consecutive communication events with a synchronization message from the single node without detection of a synchronization message is 5.

In an example embodiment of the invention, the predefined second threshold number of Step 314, of consecutive communication events with a synchronization message from the single node without detection of a synchronization message is 7.

In an example embodiment of the invention, the determining Step 302 of determining whether there are enough master nodes within range in the wireless communication network, may further comprise Steps 316, 318, and 320, as follows:

Step 316: determining, by the first wireless node, that there are enough master wireless nodes within range in the wireless communication network;

Step 318: calculating, by the first wireless node, a random draw based on at least one of a current number of master wireless nodes within range or an estimated number of wireless nodes within range in the wireless communication network; and Step 320: assuming, by the first wireless node, a role of a master wireless node to participate in synchronization message contention in the communications network, in response to winning the random draw.

FIG. 5 illustrates an example embodiment of the invention, wherein examples of removable storage media 126 are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Although specific example embodiments have been disclosed, a person skilled in the art will understand that changes can be made to the specific example embodiments without departing from the spirit and scope of the invention.

What is claimed is:

1. A method, comprising:
    detecting, by a first wireless node, communication events within range in a wireless communication network;
    determining, by the first wireless node, that there are not enough master nodes within range, when detecting communication events only from a single node, wherein a master node competes with other master nodes to transmit a synchronization message in the wireless communication network, when detecting communication events having a synchronization message only from a single node; and
    assuming, by the first wireless node, a role of a master node to participate in contention to transmit a synchronization message in the wireless communication network, in response to the determination that there are not enough master nodes within range.

2. The method of claim 1, wherein determining whether there are enough master nodes within range in the wireless communication network comprises:
    detecting, by the first wireless node, communication events within range in the wireless communication network; and
    calculating, by the first wireless node, a number of consecutive communication events without detection of a synchronization message.

3. The method of claim 2, further comprising:
    determining, by the first wireless node, that there are not enough master nodes within range when the calculated number of consecutive communication events without detection of a synchronization message exceeds a first predefined threshold number.

4. The method of claim 3, wherein the predefined first threshold number of consecutive communication events without detection of a synchronization message is 3.

5. The method of claim 3, wherein the predefined first threshold number of consecutive communication events without detection of a synchronization message is 5.

6. The method of claim 1, wherein determining whether there are enough master nodes within range in the wireless communication network comprises:
    detecting, by the first wireless node, communication events within range in the wireless communication network; and
    calculating, by the first wireless node, a number of consecutive communication events with a synchronization message from a single node.

7. The method of claim 6, further comprising:
    determining, by the first wireless node, that there are not enough master nodes within range when the calculated number of consecutive communication events with a synchronization message from the single node exceeds a predefined second threshold number.

8. The method of claim 7, wherein the predefined second threshold number of consecutive communication events with a synchronization message from the single node without detection of a synchronization message is 5.

9. The method of claim 7, wherein the predefined second threshold number of consecutive communication events with a synchronization message from the single node without detection of a synchronization message is 7.

10. The method of claim 1, further comprising:
    determining, by the first wireless node, that there are enough master wireless nodes within range in the wireless communication network;
    calculating, by the first wireless node, a random draw based on at least one of a current number of master wireless nodes within range or an estimated number of wireless nodes within range in the wireless communication network; and
    assuming, by the first wireless node, a role of a master wireless node to participate in synchronization message contention in the communications network, in response to winning the random draw.

11. An apparatus, comprising:
    at least one processor;
    at least one memory including computer program code;
    the at least one memory and the computer program code configured to, with the at least one processor, cause the apparatus at least to:
    detect communication events within range in a wireless communication network;
    determine that there are not enough master nodes within range, when detecting communication events only from a single node, wherein a master node competes with other master nodes to transmit a synchronization message in the wireless communication network, when detecting communication events having a synchronization message only from a single node; and
    assume a role of a master node to participate in contention to transmit a synchronization message in the wireless communication network, in response to the determination that there are not enough master nodes within range.

12. The apparatus of claim 11, wherein determining whether there are enough master nodes within range in the wireless communication network comprises:
    the at least one memory and the computer program code configured to, with the at least one processor, cause the apparatus at least to:
    detect communication events within range in the wireless communication network; and
    calculate a number of consecutive communication events without detection of a synchronization message.

13. The apparatus of claim 12, further comprising:
    the at least one memory and the computer program code configured to, with the at least one processor, cause the apparatus at least to:
    determine that there are not enough master nodes within range when the calculated number of consecutive communication events without detection of a synchronization message exceeds a first predefined threshold number.

14. The apparatus of claim 13, wherein the predefined first threshold number of consecutive communication events without detection of a synchronization message is 3.

15. The apparatus of claim 13, wherein the predefined first threshold number of consecutive communication events without detection of a synchronization message is 5.

16. The apparatus of claim 11, wherein determining whether there are enough master nodes within range in the wireless communication network comprises:
    the at least one memory and the computer program code configured to, with the at least one processor, cause the apparatus at least to:
    detect communication events within range in the wireless communication network; and calculate a number of consecutive communication events with a synchronization message from a single node.

17. The apparatus of claim 16, further comprising:
the at least one memory and the computer program code configured to, with the at least one processor, cause the apparatus at least to:
determine that there are not enough master nodes within range when the calculated number of consecutive communication events with a synchronization message from the single node exceeds a predefined second threshold number.

18. The apparatus of claim 17, wherein the predefined second threshold number of consecutive communication events with a synchronization message from the single node without detection of a synchronization message is 5.

19. The apparatus of claim 17, wherein the predefined second threshold number of consecutive communication events with a synchronization message from the single node without detection of a synchronization message is 7.

20. The apparatus of claim 11, further comprising:
the at least one memory and the computer program code configured to, with the at least one processor, cause the apparatus at least to:
determine that there are enough master wireless nodes within range in the wireless communication network;
calculate a random draw based on at least one of a current number of master wireless nodes within range or an estimated number of wireless nodes within range in the wireless communication network; and
assume a role of a master wireless node to participate in synchronization message contention in the communications network, in response to winning the random draw.

21. A computer program product comprising computer executable program code recorded on a computer readable non-transitory storage medium, the computer executable program code comprising:
code for detecting, by a first wireless node, communication events within range in a wireless communication network;
code for determining, by the first wireless node, that there are not enough master nodes within range, when detecting communication events only from a single node, wherein a master node competes with other master nodes to transmit a synchronization message in the wireless communication network, when detecting communication events having a synchronization message only from a single node; and
code for assuming, by the first wireless node, a role of a master node to participate in contention to transmit a synchronization message in the wireless communication network, in response to the determination that there are not enough master nodes within range.

* * * * *